Patented May 22, 1934

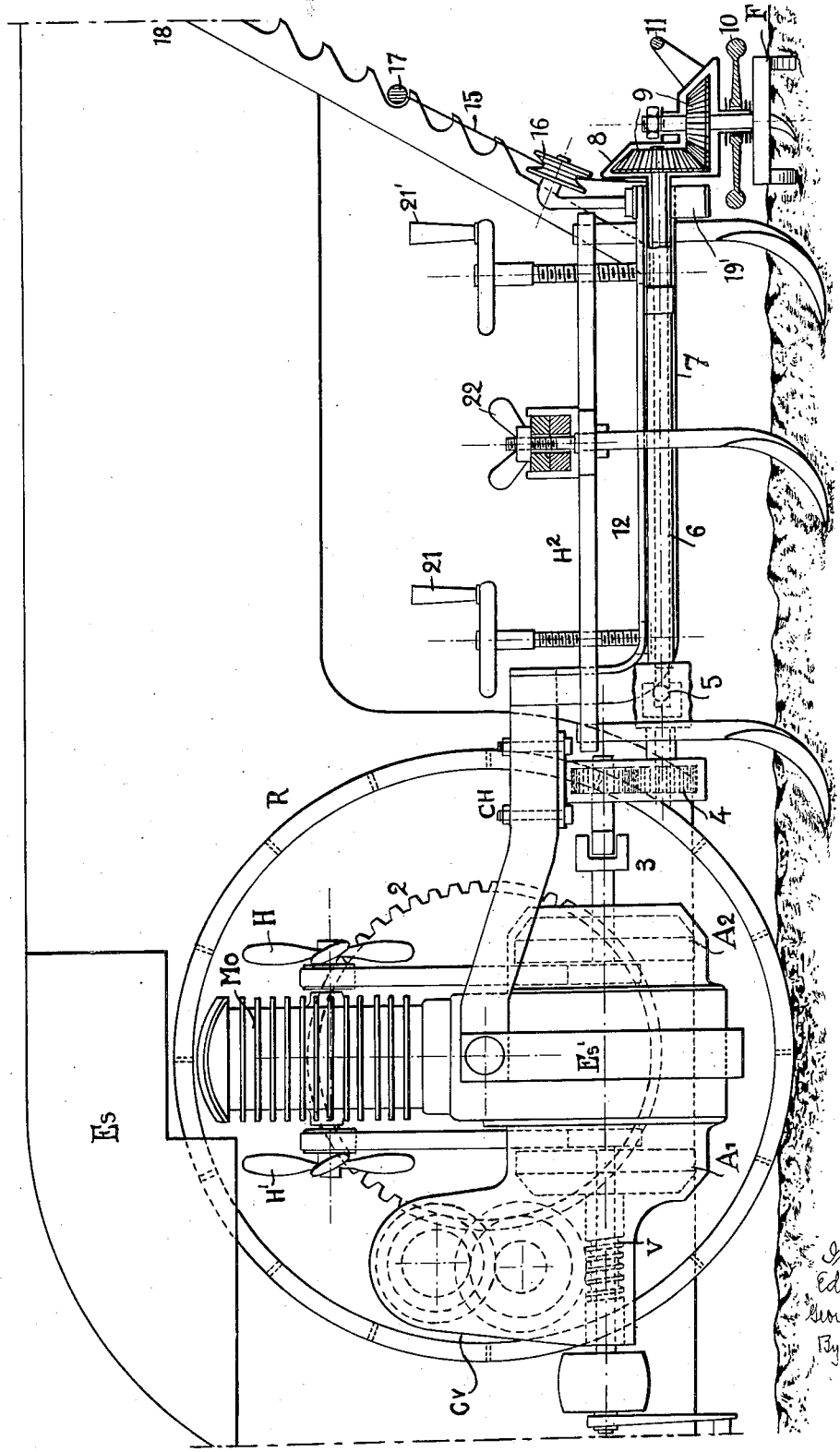

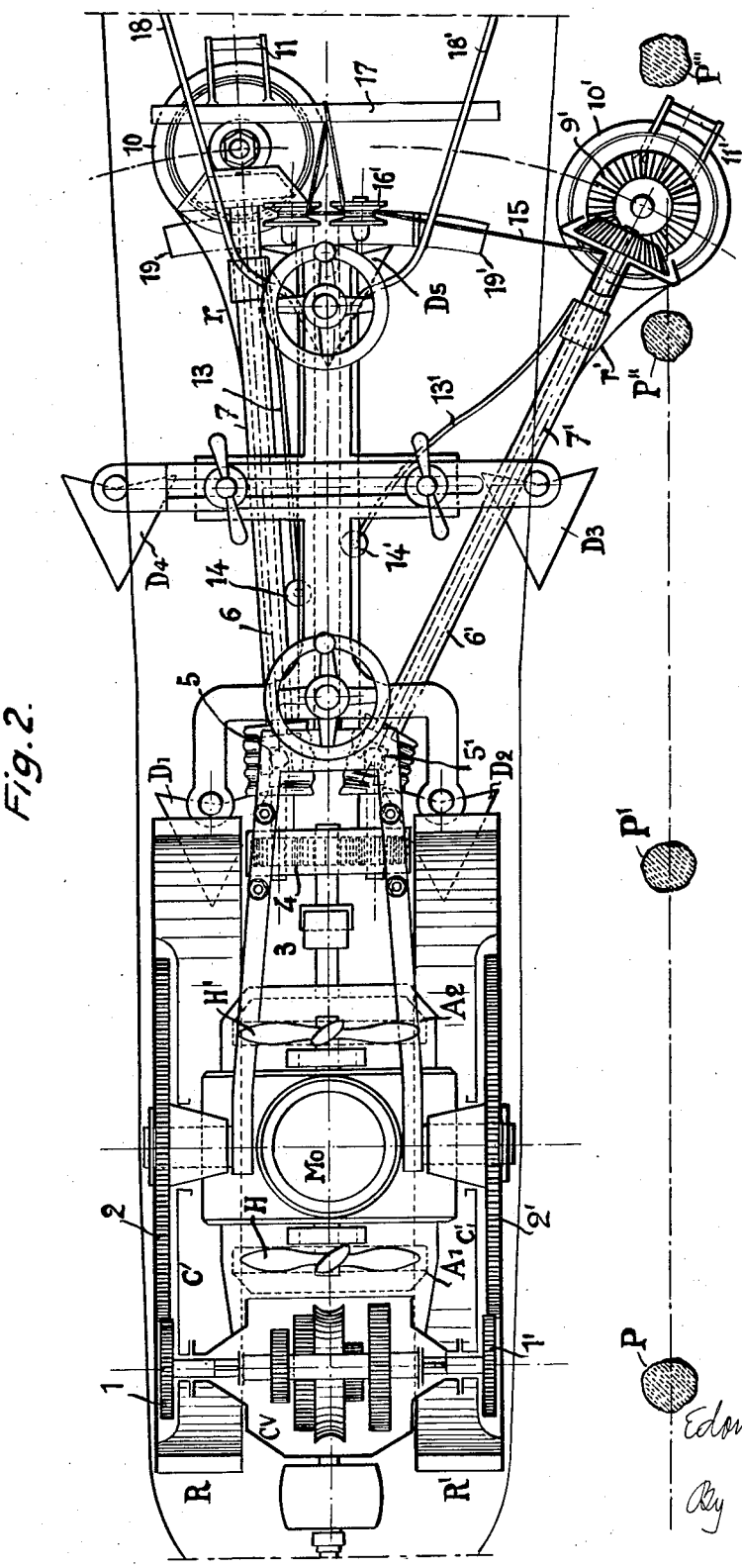

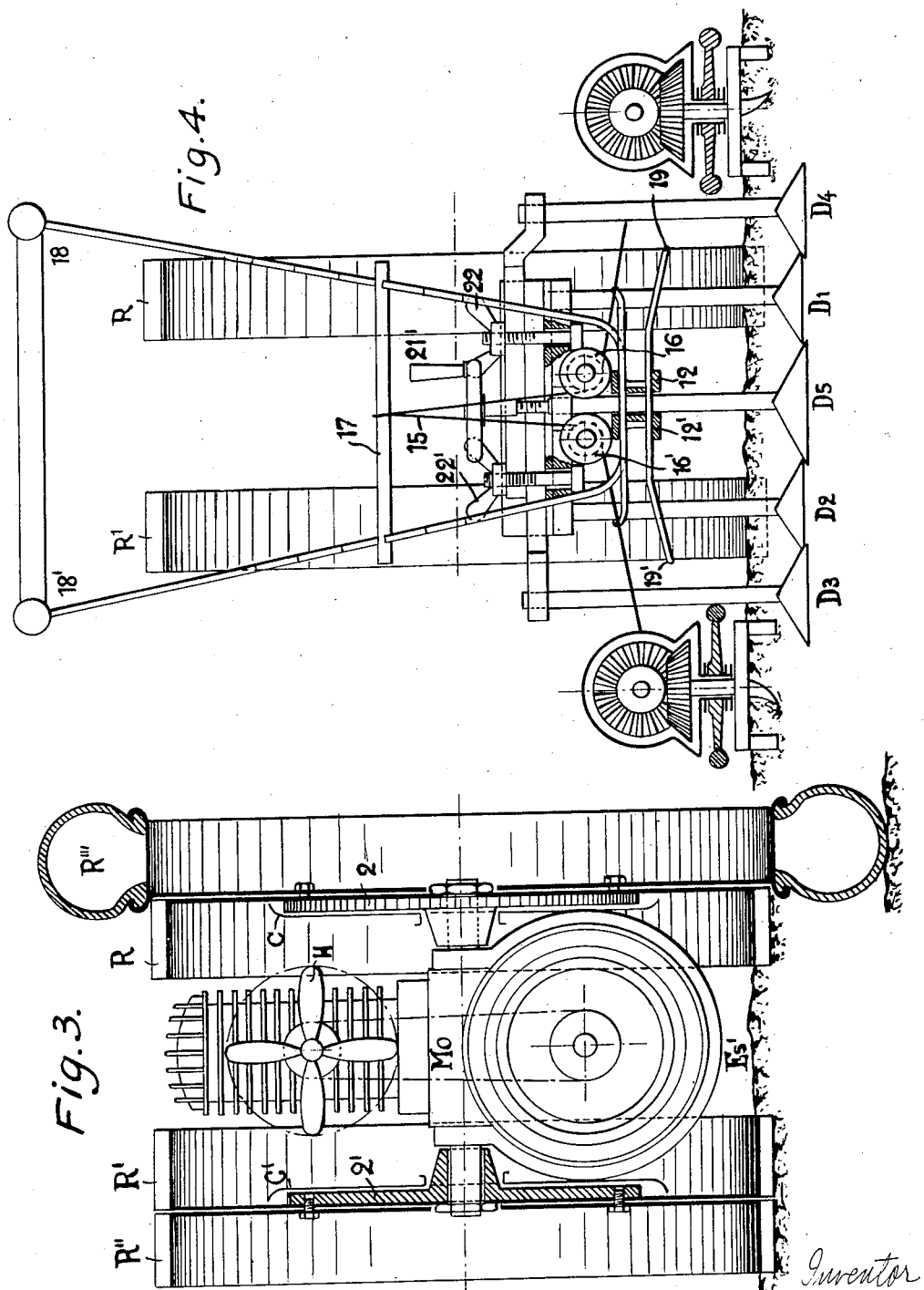

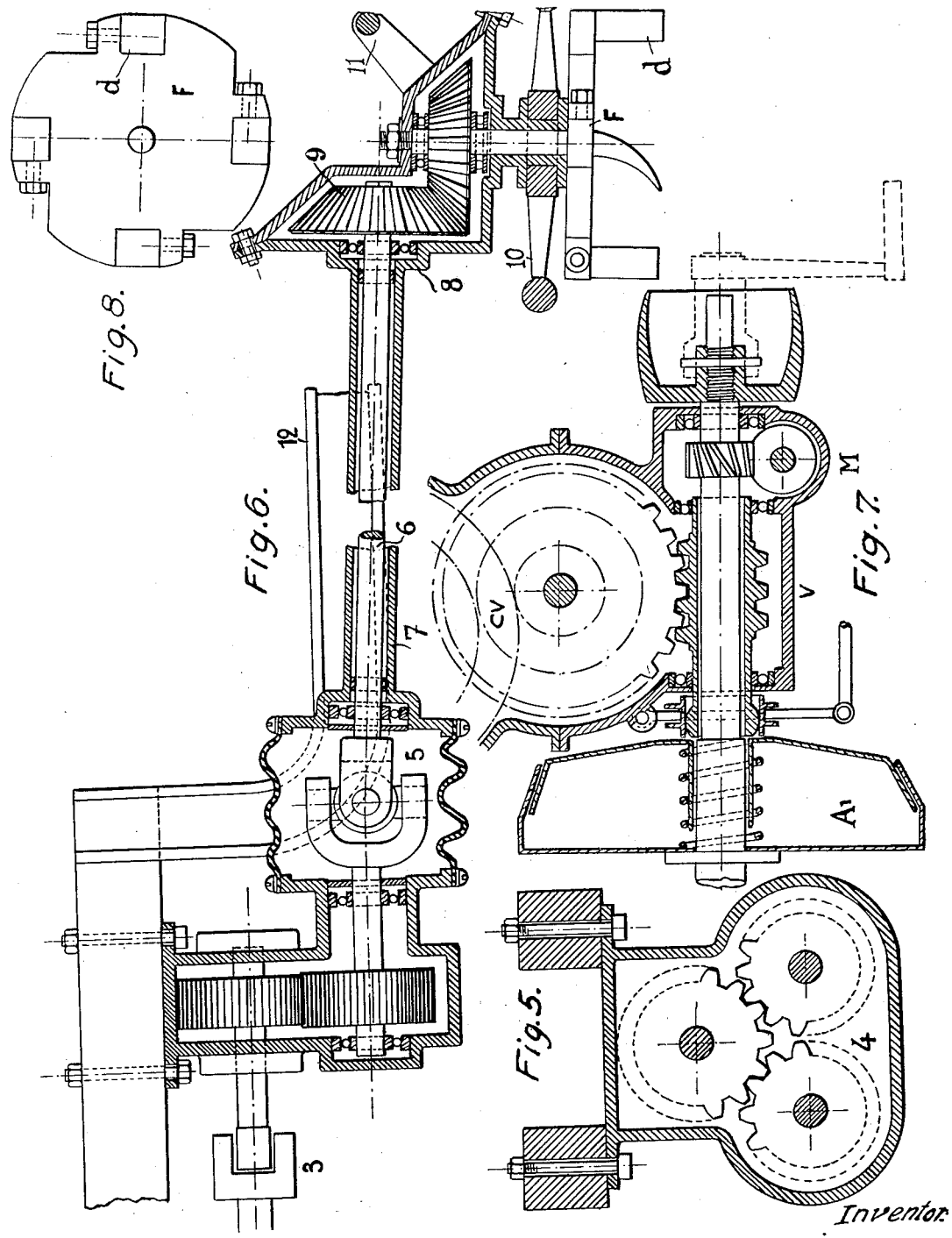

1,959,942

UNITED STATES PATENT OFFICE 1,959,942

HOEING TRACTIVE ENGINE

Edouard Georges Avignon, Vitry Sur Seine, France

Refiled for abandoned application Serial No. 185,554, April 21, 1927. This application December 24, 1931, Serial No. 583,059. In France April 28, 1926

5 Claims. (Cl. 97—43)

This application is a continuation of my copending application for Letters Patent of the United States for Tractors, Serial No. 185,554, filed April 21, 1927.

This invention relates to improvements in cultivating tractive engines, the object of the invention being to provide an improved machine of this kind which is light and compact and of reduced dimensions, and which includes a frame extending rearwardly from the tractor and drawn thereby, relatively fixed tillage tools secured to the frame, a pair of beams pivotally connected at their front ends to the tractor, a longitudinal shaft mounted in each beam for rotation and geared at its front end to the power shaft of the tractor, revoluble tillage tools each having a vertical shaft geared to one of the first named shafts, and carried by the beams and means to adjust the beams laterally toward and from each other to vary the width of the space between the revoluble tillage tools, as may be desired, and which machine is adapted for use for plowing, cultivating, ridging and other operations necessary in the cultivation of growing plants.

With the above and other objects in view, the invention consists in the construction, combination and arrangement of devices hereinafter described and claimed.

In the accompanying drawings

Figure 1 is a side elevation of a cultivating tractive engine constructed and arranged in accordance with this invention.

Figure 2 is a plan of the same.

Figure 3 is a vertical transverse sectional view of the same on the plane nearly coincident with the axle.

Figure 4 is a rear elevation of the same partly in section.

Figure 5 is a detail transverse sectional view of the rear portion of the frame member CH, the casing $f^4$ and the gears which transmit rotation from the motor shaft to the driving shafts of the revoluble tillage tools carried by the beams.

Figure 6 is a detail longitudinal sectional view of one of the beams and shafts and associated parts.

Figure 7 is a detail vertical longitudinal sectional view of the motor shaft and its driving connections.

Figure 8 is a detail plan of one of the revoluble tillage tools.

The tractor as here shown comprises a bent axle Es on the spindles of which the ground wheels R, R' are mounted and which are secured to toothed gear wheels 2, 2' respectively. Ground wheels R'' are here shown in Figure 3 as secured on the outer sides of the wheels R, R' and one of these is also here shown in said figure as provided with a tractive tire R'''. Shields C, C' are arranged opposite the inner sides of said gear wheels to protect them from earth. A frame CH extends rearwardly from and has the front ends of its side arms secured to the bent axle Es. The main frame or body X of the tractor is provided near its front end with bearings $a$ for a transverse shaft $b$, which is provided at the ends with spur gears 1, 1' which respectively engage the gears 2, 2'. Said shaft is connected by transmission gears $c$ to a shaft $d$ which is below shaft $b$ and is provided with a worm gear $e$ which is engaged by a worm V on the longitudinally arranged crank shaft $f$ of the motor Mo, the block or body of which is mounted in the depending bent of the axle Es, as shown. The fans of the motor are indicated at H, H', and are driven by belts and pulleys from the shaft $f$, as is usual.

The worm gears for starting the motor by the magneto are indicated at M in Figure 7, and the clutch for connecting and disconnecting the shaft $f$ to and from the worm V which is loose on the said shaft, is indicated at $A^1$ in Figure 7, the bearings for said worm being indicated as ball bearings at $g$. A shaft $f'$ is mounted in suitable bearings in rear of the motor and in line with the crank shaft $f$, and may be connected to and disconnected from said shaft $f$ by means of a suitable clutch which is indicated in Figures 1 and 2 at $A^2$. A shaft $f^2$ is connected to the rear end of the shaft $f'$ by a joint $f^3$ and is mounted in bearings in a casing $f^4$, which casing is bolted to the under sides of the arms of the frame CH as at $f^5$. Said shaft $f^2$ has a spur gear $f^6$ fast thereon.

A pair of rearwardly extending bars 12, 12' have their front ends secured to the rear end of the frame CH. A frame member $H^2$ has a pair of spaced forwardly extending arms $h$ at its front end, and a pair of laterally extending arms $h'$ at a point about midway between its ends. Relatively fixed tillage tools, are attached to and carried by the said member and are here shown as cultivator plows. The plows D', $D^2$ are secured to the arms $h$, the plow $D^5$ is secured to the rear portion of member $H^2$ and the plows $D^3$, $D^4$ are secured to arms $h^3$, which are arranged one on top of the other, and bear on the arms $h'$, said arms $h^3$ being each provided with a longitudinal slot $h^4$, and being slidable laterally, to arrange the plows $D^3$, $D^4$ at any required distance apart, and being secured together and to the arms $h'$ at any desired adjusted position by manually operable clamping screws 22, 22'. The standard or shank of the plow $D^5$ passes upwardly between the bars 12, 12', and said member $H^2$, which directly carries the plows, is above the said bars and is secured thereto and adapted to be vertically adjusted with respect thereto, by manually operable screws 21, 21'.

A pair of beams 7, 7' which are here shown as tubular have their front ends connected pivotally to the casing $f^4$ which forms a part of the frame of the tractor by Cardan joints 5, 5' and at the rear end of each such beam is a casing 8 which has a bearing $8^a$ for the vertical shaft $d^2$ of a revoluble tillage tool F, which is here shown as provided with detachable cultivator teeth $d^3$. Hand wheels 10 are loosely mounted also on the bearings $8^a$, and may be manually grasped in order to properly initially position the tools F.

In each tubular beam 7 is a shaft 6 which is mounted for rotation and provided with bearings $6^a$ and each shaft 6 has its rear end connected to the upper end of the associated shaft $d^2$ by means of a pair of mitre gears 9. A pair of shafts $6^b$ are mounted in bearings $6^c$ in the casing $f^4$ and each such shaft is provided with a gear 4 which engages the gear $f^6$ of the shaft $f^2$. The rear end of each shaft $6^b$ is connected by a suitable universal joint 5 to the front end of one of the shafts 6. Each casing 8 is provided with a suitable handle 11 to enable the rear ends of the beams 7 and the tillage tools F carried thereby to be raised when the machine is not in use or to avoid an obstruction when the machine is in operation.

Springs 13, 13' are provided for independently moving the beams 7, 7' and hence the revoluble tillage tools carried thereby outwardly. As here shown each of these springs is secured at its rear end to the rear portion of one of the beams, and the said springs are respectively provided at their front ends with rollers 14, 14' which operate in channels in the outer sides of the bars 12, 12', as shown.

In practice several sets of the springs, of more or less strength, may be provided for the machine and substituted one for another according to the nature of the work, and it will be understood that the revoluble tillage tools or cutters may be substituted for others of greater or less diameter and provided with teeth differing from those here shown.

A pair of guiding handles 18, 18' are secured at their lower ends to the bars 12, 12', are connected together by a cross bar 17 and are provided in their rear sides with notches $18^a$ in which the cross bar 17 may be arranged and held at any desired vertical adjustment. At the rear ends of the bars 12, 12' are upwardly extending standards $12^a$ having downwardly and rearwardly inclined spindles $12^b$ on which are mounted grooved pulleys 16, 16'. Cords 15 to enable the rear ends of the beams 7, 7' to be drawn inwardly independently of each other, against the tension of the springs 14, 14', pass over the cross bar 17 which is vertically adjustable and on the inner sides of the pulleys 16, 16', and have their outer ends attached to the rear ends of said beams, as shown in Figure 2.

Transversely extending upper and lower retaining bars 19, 19' are secured to the bars 12, 12' and between them either one of the beams 7, 7' may be arranged when raised by its handle 11 or 11' to put such beam and the rotating tillage tool carried thereby out of operation while the other is in use, as indicated in Figure 2. The upper bar 19 has its ends upturned as at 20 to hold the rear ends of said beams thereon when said beams have been raised and the machine is being driven, without operating, from one point to another.

It will be noted that the motor block, tractive wheels and hoe are covered by a movable cockpit-case which covers also the fuel and oil tanks and also the radiator. Such case is stem-shaped and of slender form, so that the machine can pass between rows of plants which are badly dressed and not in line without any damage to them, all the revolving tilling tools being provided with the protecting hand wheels or fenders 10, 10'. The said case may be also open worked to allow a better cooling of the engine by the two fans H, H'.

The operating levers of the clutches $A^1$, $A^2$ are arranged in practice in the immediate vicinity of the controlling levers of the machine. The hands of the driver are protected against injury by loose branches by suitable hilt-shaped guards.

To the wheel R, R' can be secured by means of bolts, other wheels as R'' (Figure 3), in order to increase traction during plowing and tires such as R''' may be employed for travel on roads.

The clutch $A^1$ is locked on the engine shaft, and its movable comb (Figure 7) slides on an end of the worm V in connection with the gears $Cv$. The motor shaft passes through said worm, comes out on the front of the housing and may receive a starting crank Y and has a pulley Z for use in driving various agricultural or other machines.

In starting operation, clutches $A^1$, $A^2$ are uncoupled. The engine being started, $A^1$ is coupled and the machine enters between two rows of the plants, the operator raises the rear part of the machine by means of the handles 18, 18' in the same manner as a barrow. The member $H^2$ is now lowered sufficiently and the bar 17 brought down. Pressed by the springs, the beams 7, 7' are separated, come down along the bars 19, 19', and the fender wheels 10, 10' come into contact with the plants P, P', P'', P''' of both the right and left hand rows, and the bar 17 is brought into appropriate intermediate notches in the handles to cause maximum opening outwardly of the beams. The teeth of the members F, F' now are on the soil and $A^2$ is brought into clutching condition. Owing to their rapid rotary movement and to that of the fender wheels 10, 10', the revoluble members move easily and follow the sinuosities of the rows of plants as will be understood.

At the end of the row 17 will be raised, $A^2$ disconnected, and the engine then completely turned and caused to enter again between two other rows.

Having thus described my invention, I claim:

1. A tractor having a power shaft, a frame extending rearwardly from the tractor and drawn thereby, relatively fixed tillage tools secured to the frame, a pair of beams pivotally connected at their front ends to the tractor, a longitudinal shaft mounted in each beam for rotation and geared at its front end to the power shaft of the tractor, revoluble tillage tools each having a vertical shaft geared to one of the first named shafts, said beams having supporting and bearing means for said vertical shafts, and means to adjust the beams laterally toward and from each other to vary the width of the space between the revoluble tillage tools carried thereby as may be desired.

2. A tractor having a power shaft, a frame extending rearwardly from the tractor and drawn thereby, relatively fixed tillage tools secured to the frame, a pair of beams pivotally connected at their front ends to the tractor, a longitudinal shaft mounted in each beam for rotation and geared at its front end to the power shaft of the tractor, revoluble tillage tools each having a vertical shaft geared to one of the first named shafts, said beams having supporting and bearing means for said vertical shafts, and means to adjust the beams laterally toward and from each other to vary the width of the space between the revoluble tillage tools carried thereby as may be desired, said means comprising springs to move the rear ends of the beams outwardly and cords for drawing them toward each other against the tension of the springs.

3. Apparatus as claimed in claim 1, including means for vertically adjusting the frame which carries the relatively fixed tillage tools.

4. Apparatus as claimed in claim 1, including springs for independently moving the beams and hence the tillage tools carried thereby outwardly, each of said springs being attached at one end to one of the beams and being slidably engaged at its inner end with an element of the frame.

5. Apparatus as claimed in claim 1, including guiding handles attached to the rear end of the frame.

EDOUARD GEORGES AVIGNON.